US010713048B2

United States Patent
Greiner et al.

(10) Patent No.: US 10,713,048 B2
(45) Date of Patent: Jul. 14, 2020

(54) CONDITIONAL BRANCH TO AN INDIRECTLY SPECIFIED LOCATION

(71) Applicant: INTERNATIONAL BUSINESS MACHINES CORPORATION, Armonk, NY (US)

(72) Inventors: Dan F. Greiner, San Jose, CA (US); Christian Jacobi, West Park, NY (US); Anthony Saporito, Highland, NY (US); Chung-Lung K. Shum, Wappingers Falls, NY (US); Timothy J. Slegel, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 158 days.

(21) Appl. No.: 15/409,614

(22) Filed: Jan. 19, 2017

(65) Prior Publication Data
US 2018/0203696 A1   Jul. 19, 2018

(51) Int. Cl.
*G06F 9/30* (2018.01)
*G06F 9/355* (2018.01)

(52) U.S. Cl.
CPC ........ *G06F 9/30058* (2013.01); *G06F 9/3004* (2013.01); *G06F 9/30018* (2013.01); *G06F 9/30145* (2013.01); *G06F 9/30167* (2013.01); *G06F 9/355* (2013.01)

(58) Field of Classification Search
CPC .. G06F 9/3004; G06F 9/3005; G06F 9/30054; G06F 9/30058; G06F 9/35; G06F 9/355
See application file for complete search history.

(56) References Cited

U.S. PATENT DOCUMENTS

| 797,671 A | 8/1905 | Draper |
| 5,471,597 A * | 11/1995 | Byers ...................... G06F 9/262 |
| | | 711/215 |
| 6,721,875 B1 | 4/2004 | McCormick, Jr. et al. |
| 6,874,081 B2 * | 3/2005 | Kruckemyer .......... G06F 9/324 |
| | | 711/220 |
| 6,985,496 B2 | 1/2006 | Miyamoto et al. |
| 7,194,609 B2 | 3/2007 | Schlansker et al. |
| 2009/0177874 A1 | 7/2009 | Terashima |
| 2009/0182942 A1 | 7/2009 | Greiner et al. |
| 2009/0182983 A1 | 7/2009 | Greiner et al. |

(Continued)

OTHER PUBLICATIONS

Steven, G. B. et al., "ALU Design and Processor Branch Architecture," Microprocessing and Microprogramming, Elsevier Science Publishers, vol. 36, No. 5, Oct. 1993, pp. 259-278.

(Continued)

*Primary Examiner* — Benjamin P Geib
(74) *Attorney, Agent, or Firm* — Steven Chiu, Esq.; Blanche E. Schiller, Esq.; Heslin Rothenberg Farley & Mesiti P.C.

(57) ABSTRACT

An instruction to perform a conditional branch to an indirectly specified location is executed. A branch address is obtained from a location in memory, the location in memory designated by the instruction. A determination is made, based on a condition code of another instruction, whether a branch is to occur, and a branch to the branch address is performed, based on determining the branch is to occur.

20 Claims, 8 Drawing Sheets

(56) References Cited

U.S. PATENT DOCUMENTS

2014/0281441 A1  9/2014  Manoukian
2015/0339125 A1  11/2015  Lin

OTHER PUBLICATIONS

IBM, "z/Architecture—Principles of Operation," SA22-7832-10, 11$^{th}$ Edition, Mar. 2015, pp. 1-1732.

IBM, "Power ISA—V2.07B," Apr. 9, 2015, pp. 1-1527.

Evers, Marius et al., "Understanding Branches and Designing Branch Predictors for High-Performance Microprocessors," Proceedings of the IEEE, vol. 89, No. 11, Nov. 2001, pp. 1610-1620.

Casey, Kevin et al., "Optimizing Indirect Branch Prediction Accuracy in Virtual Machine Interpreters," ACM SIGPLAN Notices, 38(5), May 2003, pp. 278-288.

IBM, "z/Architecture—Principles of Operation," SA22-7832-10, 11$^{th}$ Edition, Mar. 2015, pp. 5-10 thru 5-11; 7-37 through 7-38 (+ cover pages).

\* cited by examiner

300
BRANCH INDIRECT ON CONDITION
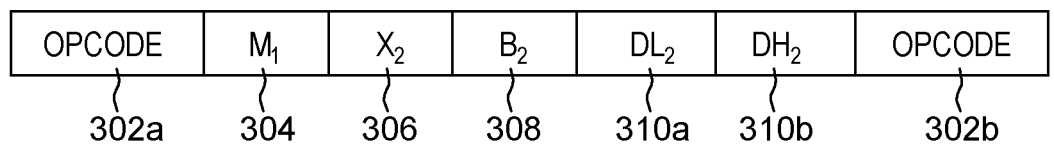
FIG. 3A
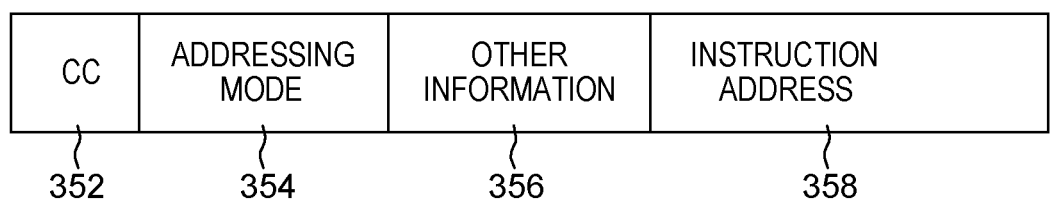
FIG. 3B
350
PROGRAM STATUS WORD
| CC | ADDRESSING MODE | OTHER INFORMATION | INSTRUCTION ADDRESS |
|---|---|---|---|
| 352 | 354 | 356 | 358 |
FIG. 3C

THE DETERMINING WHETHER THE BRANCH IS TO OCCUR INCLUDES

USING THE CONDITION CODE TO SELECT A UNIT (E.G., A BIT) IN A MASK ASSOCIATED WITH THE INSTRUCTION (E.G., THE MASK IS A FIELD OF THE INSTRUCTION) ~640

CHECKING A VALUE OF THE UNIT ~644

INDICATING BRANCHING, BASED ON THE CHECKING DETERMINING THE VALUE IS A PARTICULAR VALUE ~646

THE BRANCHING INCLUDES REPLACING AN INSTRUCTION ADDRESS IN A CONTROL REGISTER WITH THE BRANCH ADDRESS, AND PROCEEDING TO THE BRANCH ADDRESS TO CONTINUE PROCESSING ~650

FIG. 6B

CONDITIONAL BRANCH TO AN INDIRECTLY SPECIFIED LOCATION

BACKGROUND

One or more aspects relate, in general, to processing within a computing environment, and in particular, to improving such processing.

Processing within a computing environment often includes the use of branch instructions that transfer control from one part of a computer program to another part of the program. There are different types of branch instructions, including conditional branch instructions, which transfer control to another part of the program based on results of a previously established condition, such as based on the results of a compare instruction. One example of a conditional branch instruction is a Branch On Condition instruction included in the Instruction Set Architecture (ISA) of the z/Architecture, offered by International Business Machines Corporation, Armonk, N.Y.

The Branch On Condition instruction designates an operand, which specifies an address (also referred to as a location) to be used to replace an instruction address of a program status word (PSW), if any of the branching conditions is true. In one form of the instruction, the operand (i.e., the branch address) is designated in a register. In yet a further example, the operand or branch address is formed from the sum of the contents of a base register, the contents of an index register and a 12-bit unsigned displacement.

Additionally, other branch instructions, such as a Branch Relative On Condition instruction, specify the operand branch location as a signed integer designating the number of half-words added to the address of the instruction to form the new PSW instruction address.

For a number of the conditional branch instructions, a general register is used to form the branch location. This poses a challenge to program design when the contents of such a general register used in a conditional branching instruction are to be loaded from storage. In certain programming situations, a spare general register may not be available for use by the branching instruction.

SUMMARY

Shortcomings of the prior art are overcome and additional advantages are provided through the provision of a computer program product for facilitating processing within a computing environment. The computer program product comprises a storage medium readable by a processing circuit and storing instructions to perform a method. The method includes, for instance, obtaining an instruction to perform a conditional branch to an indirectly specified location, and executing the instruction. The executing includes obtaining a branch address from a location in memory, the location in memory designated by the instruction; determining based on a condition code of another instruction whether a branch is to occur; and branching to the branch address obtained from the location in memory, based on determining the branch is to occur. This conditional branch to an indirectly specified location facilitates processing by not requiring the branch location to be known at compile time and eliminates the need for additional registers beyond what is available to the program (i.e., the program stack register).

In one embodiment, the instruction includes an operation code to designate the conditional branch to an indirectly specified location operation, a mask field to be used in the determining of whether the branch is to occur, and a plurality of fields to be used to determine the location in memory from which the branch address is obtained.

The location in memory is determined by using the plurality of fields of the instruction. The plurality of fields includes, for example, a base field, an index field and at least one displacement field. For instance, the contents of a first register specified by the index field, contents of a second register specified by the base field, contents of a first displacement field, and contents of a second displacement field are added to obtain an address of the location in memory.

As one example, the condition code is obtained from a control register (e.g., a program status word (PSW)), and the determining whether the branch is to occur includes using the condition code to select a unit in a mask associated with the instruction; checking a value of the unit; and indicating branching, based on the checking determining the value is a particular value. The mask is, for instance, a field of the instruction, and the unit is a bit, in one example.

The branching includes, for instance, replacing an instruction address in a control register (e.g., a PSW) with the branch address; and proceeding to the branch address to continue processing Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 3A depicts one example of a Branch Indirect On Condition instruction, in accordance with an aspect of the present invention;

FIG. 3B depicts one example of information relating to the mask field of FIG. 3A, in accordance with an aspect of the present invention;

FIG. 3C depicts one example of a program status word (PSW), used in accordance with an aspect of the present invention;

FIGS. 6A-6B depict one embodiment of aspects relating to facilitating processing in a computing environment, in accordance with an aspect of the present invention.

DETAILED DESCRIPTION

In accordance with an aspect of the present invention, a capability is provided in which a branch location (e.g., a branch address) is specified in storage (also referred to herein as memory; storage and memory are used herein interchangeably unless indicated otherwise, either implicitly or explicitly). In particular, in one example, an instruction (e.g., a single architected machine instruction at the hardware/software interface) is used to provide an indirect branching mechanism in which the branch location is specified in storage. One example of such an instruction is a Branch Indirect On Condition instruction, described further below.

One embodiment of a computing environment to incorporate and use one or more aspects of the present invention is described with reference to FIG. 1A. In one example, the computing environment is based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. Z/ARCHITECTURE is a registered trademark of International Business Machines Corporation, Armonk, N.Y., USA.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The computing environment may also be based on other architectures, including, but not limited to, the Intel x86 architectures. Other examples also exist.

Figure 1A:
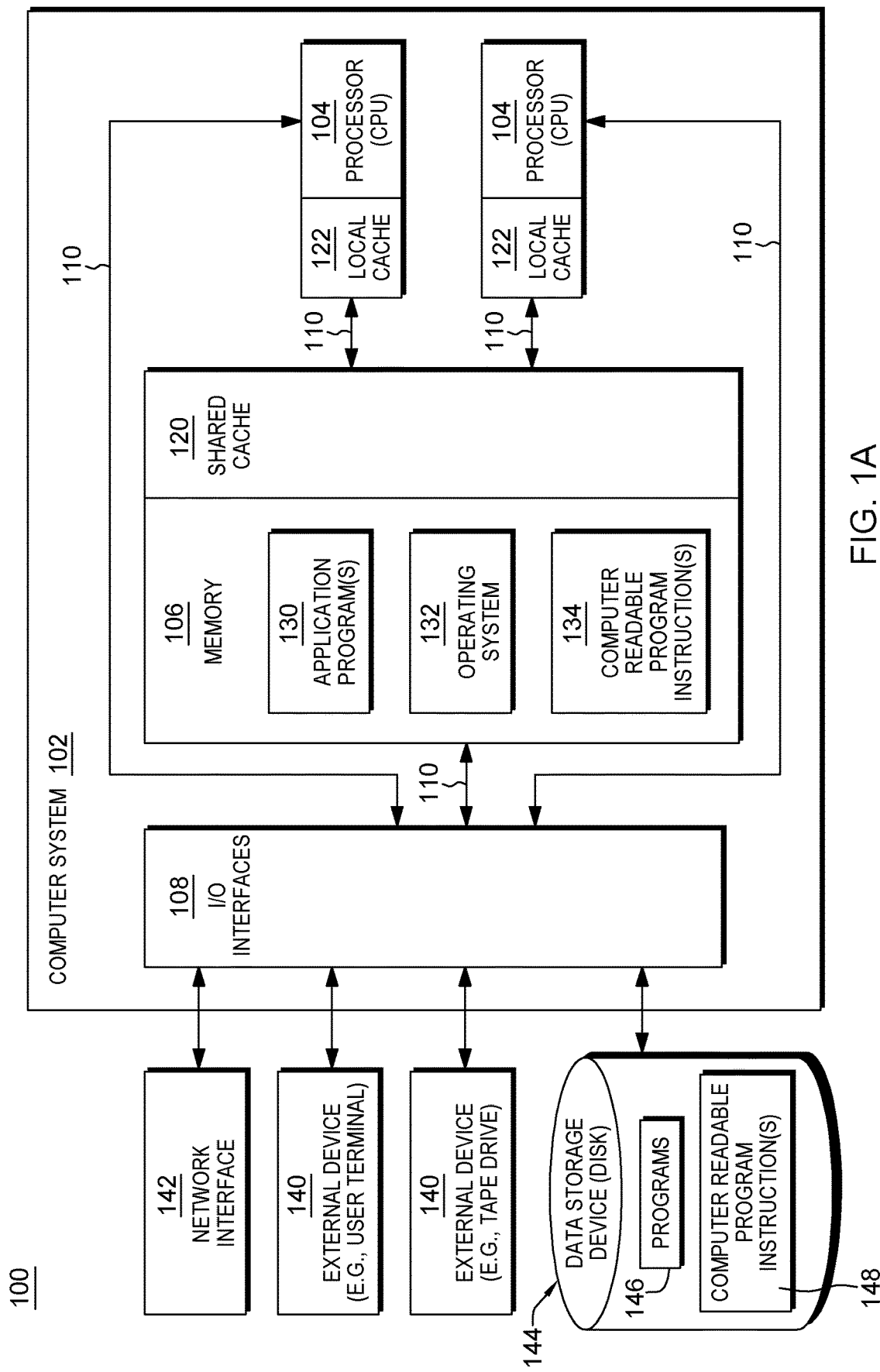
FIG. 1A depicts one example of a computing environment to incorporate and use one or more aspects of the present invention.

As shown in FIG. 1A, a computing environment 100 includes, for instance, a computer system 102, shown, e.g., in the form of a general-purpose computing device. Computer system 102 may include, but is not limited to, one or more processors or processing units 104 (e.g., central processing units (CPUs)), a memory 106 (referred to as main memory or storage, as examples), and one or more input/output interfaces 108, coupled to one another via one or more buses and/or other connections 110.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 120, such as a shared cache, which may be coupled to local caches 122 of processors 104. Further, memory 106 may include one or more programs or applications 130, an operating system 132, and one or more computer readable program instructions 134. Computer readable program instructions 134 may be configured to carry out the functions of embodiments of aspects of the invention.

Computer system 102 may also communicate via, e.g., I/O interfaces 108 with one or more external devices 140, one or more network interfaces 142, and/or one or more data storage devices 144. Example external devices include a user terminal, a tape drive, a pointing device, a display, etc. Network interface 142 enables computer system 102 to communicate with one or more networks, such as a local area network (LAN), a general wide area network (WAN), and/or a public network (e.g., the Internet), providing communication with other computing devices or systems.

Data storage device 144 may store one or more programs 146, one or more computer readable program instructions 148, and/or data, etc. The computer readable program instructions may be configured to carry out the functions of embodiments of aspects of the invention.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general purpose or special purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 1B:
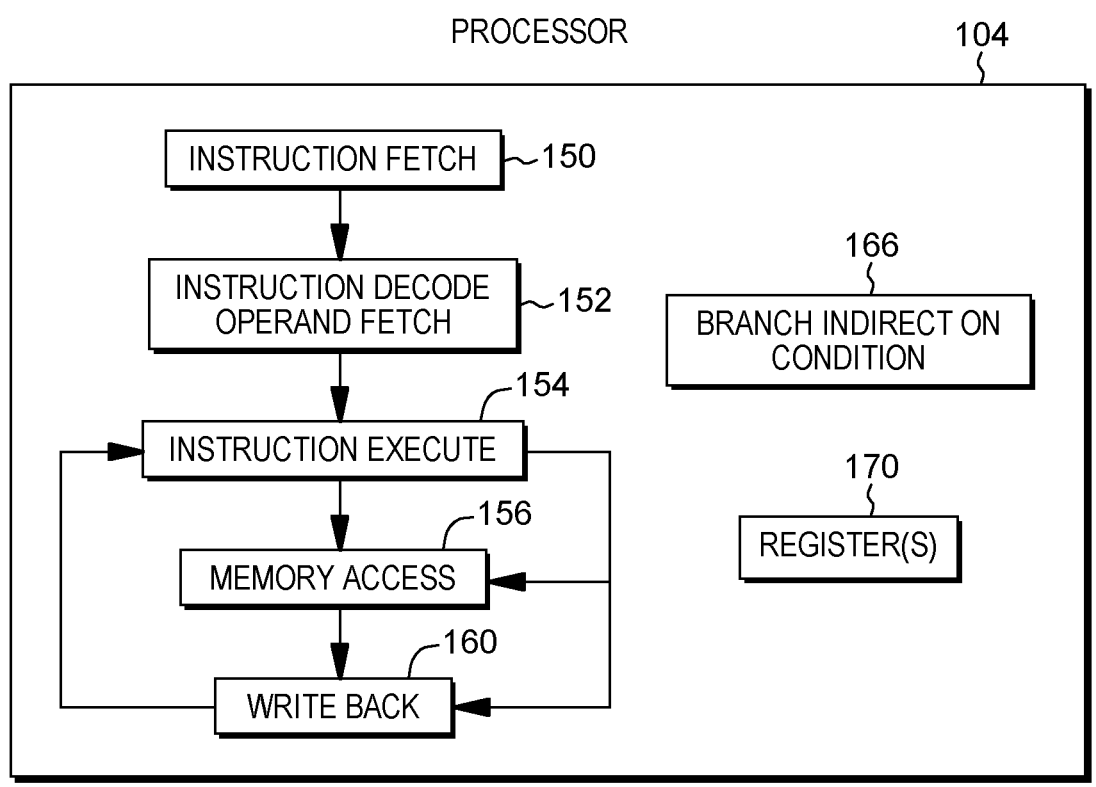
FIG. 1B depicts further details of a processor of FIG. 1A, in accordance with an aspect of the present invention.

Further details regarding one example of processor 104 are described with reference to FIG. 1B. Processor 104 includes a plurality of functional components used to execute instructions. These functional components include, for instance, an instruction fetch component 150 to fetch instructions to be executed; an instruction decode unit 152 to decode the fetched instructions and to obtain operands of the decoded instructions; instruction execution components 154 to execute the decoded instructions; a memory access component 156 to access memory for instruction execution, if necessary; and a write back component 160 to provide the results of the executed instructions. One or more of these components may, in accordance with an aspect of the present invention, be used to execute a Branch Indirect On Condition instruction 166 to branch on condition to an indirect address (e.g., an address obtained from storage, and not directly from the instruction itself), as described further below.

Processor 104 also includes, in one embodiment, one or more registers 170 to be used by one or more of the functional components.

Figure 2A:
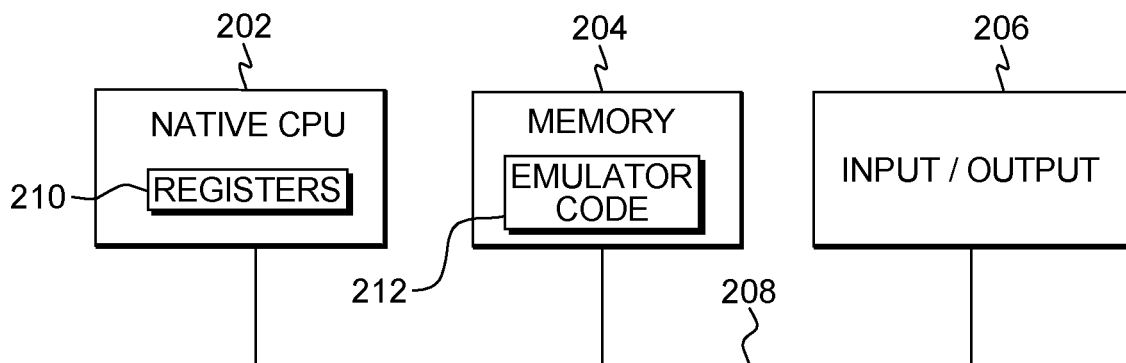
FIG. 2A depicts another example of a computing environment to incorporate and use one or more aspects of the present invention.

Another embodiment of a computing environment to incorporate and use one or more aspects is described with reference to FIG. 2A. In this example, a computing environment 200 includes, for instance, a native central processing unit (CPU) 202, a memory 204, and one or more input/output devices and/or interfaces 206 coupled to one another via, for example, one or more buses 208 and/or other connections. As examples, computing environment 200 may include a PowerPC processor or a pSeries server offered by International Business Machines Corporation, Armonk, N.Y.; and/or other machines based on architectures offered by International Business Machines Corporation, Intel, or other companies.

Native central processing unit 202 includes one or more native registers 210, such as one or more general purpose registers and/or one or more special purpose registers used during processing within the environment. These registers include information that represent the state of the environment at any particular point in time.

Moreover, native central processing unit 202 executes instructions and code that are stored in memory 204. In one particular example, the central processing unit executes emulator code 212 stored in memory 204. This code enables the computing environment configured in one architecture to emulate another architecture. For instance, emulator code 212 allows machines based on architectures other than the z/Architecture, such as PowerPC processors, pSeries servers, or other servers or processors, to emulate the z/Architecture and to execute software and instructions developed based on the z/Architecture.

Figure 2B:
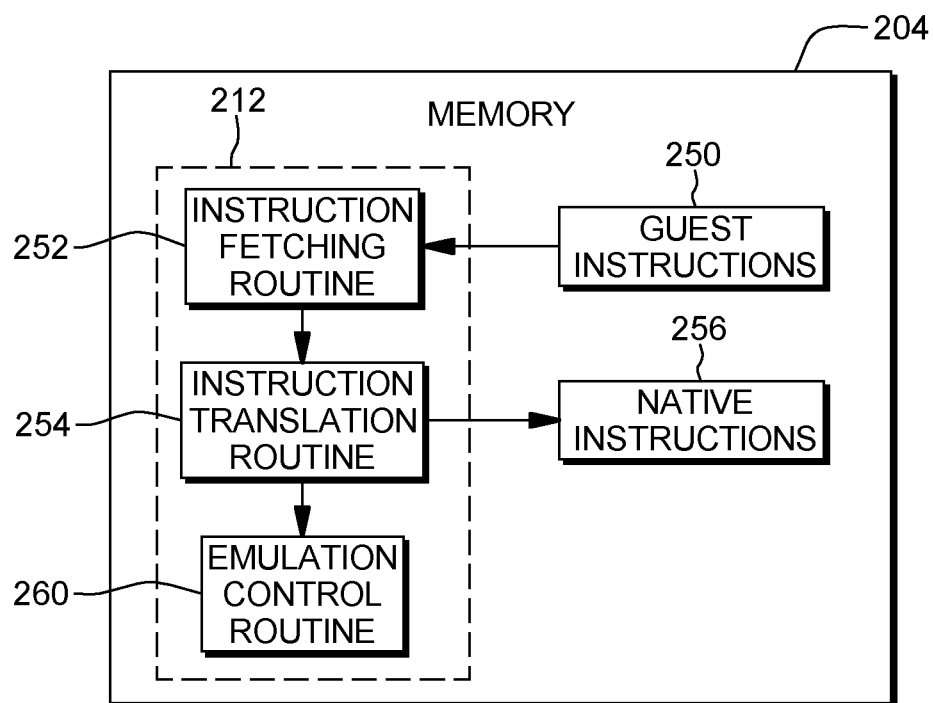
FIG. 2B depicts further details of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on a z/Architecture processor, but instead, are being emulated on native CPU 202, which may be, for example, an Intel processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator code 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode and/or Millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

A guest instruction 250 that is obtained, translated and executed is, for instance, a Branch Indirect On Condition instruction, described herein. The instruction, which is of one architecture (e.g., the z/Architecture), is fetched from memory, translated and represented as a sequence of native instructions 256 of another architecture (e.g., PowerPC, pSeries, Intel, etc.). These native instructions are then executed.

Details relating to one embodiment of a Branch Indirect On Condition instruction defined based on, e.g., the z/Architecture, are described below.

Referring to FIG. 3A, in one embodiment, a Branch Indirect On Condition (BIC) instruction 300 includes operation code (opcode) fields 302a, 302b indicating a branch indirect on condition operation; a mask field ($M_1$) 304; an index field ($X_2$) 306; a base field ($B_2$) 308; and a displacement field comprising a first displacement field ($DL_2$) 310a and a second displacement field ($DH_2$) 310b, each of which is described below. In one embodiment, the fields are separate and independent from one another; however, in another embodiment, more than one field may be combined. Further, a subscript number associated with a field denotes the operand to which the field applies. For instance, any field having a subscript 1 is associated with a first operand, and any field having a subscript 2 is associated with a second operand, and so forth.

In one example, mask field 304 is used as a four-bit mask. As shown in FIG. 3B, four condition codes 320 (e.g., 0, 1, 2, and 3) correspond, left to right, with the four bits of the mask. The current condition code (e.g., the condition code of a previously executed instruction) is used to select the corresponding mask bit. If the mask bit selected by the condition code is, e.g., one, the branch is successful. If the mask bit selected is, e.g., zero, normal instruction sequencing proceeds with the next sequential instruction.

Referring to FIG. 3B, in one embodiment, each condition code 320 corresponds to an instruction bit number 322 of mask 304 and has an associated mask position value 324. As examples, condition code 0 corresponds to instruction bit number 8 and has a mask position value of 8 (i.e., since the condition codes are defined left to right in the mask, condition code 0 is in the left-most position of the four-bit mask ($2^3$=8)); condition code 1 corresponds to instruction bit number 9 and has a mask position value of 4; condition code 2 corresponds to instruction bit number 10 and has a mask position value of 2; and condition code 3 corresponds to instruction bit number 11 and has a mask position value of 1.

The current condition code is stored, for instance, in a control register, such as a program status word (PSW). The program status word performs the functions of a status register and a program counter. It contains information used for proper program execution. For instance, it is used to control instruction sequencing and to hold and indicate status of the processor in relation to the program currently being executed. In one example, referring to FIG. 3C, a program status word 350 includes a condition code 352; an addressing mode 354 (e.g., 64-bit mode, 31-bit mode, 24-bit mode); other information 356, such as, but not limited to, the current dynamic address translation (DAT) and address space controls; and instruction address 358 (not shown in any particular order or location within the register). Condition code 352 is set to 0, 1, 2, or 3 depending on the result obtained in executing certain instructions; the condition code in the PSW is the current condition code. Instruction address 358 designates the location of the leftmost byte of the next instruction to be executed.

Returning to FIG. 3A, fields 306-310b are used to define a second operand location; i.e., a location in storage which designates a branch location. $DL_2$ 310a and $DH_2$ 310b provide a displacement, which is treated as, e.g., a 20-bit signed binary integer. The contents of the register designated by $X_2$ 306 plus the contents of the register designated by $B_2$ 308 are added to the displacement provided by $DL_2$ 310a and $DH_2$ 301b to define a location in storage. This location in storage includes a branch location (e.g., an address of a branch).

As indicated, the 8-byte second operand in storage is used as the branch address. The branch address is subject to the current addressing mode. In one example, the 8 bytes of the second operand are accessed, regardless of the addressing mode. In one example, the second operand is fetched using the current DAT (dynamic address translation), addressing mode, and address space controls specified in a control register, such as the program status word. However, the branch address that is fetched from the second operand location is treated as an instruction address, and is treated as a real address in the real mode; as a primary virtual address in the primary space mode, secondary space mode, or access register mode; and as a home virtual address in the home space mode.

Although various fields and registers are described, one or more aspects of the present invention may use other, additional or less fields or registers, or other sizes of fields and registers, etc. Many variations are possible. For instance, implied registers may be used instead of explicitly specified registers or fields of the instruction. Additionally, in other embodiments, extended mnemonic suffixes for the instruction may be used, which replace the mask. Again, other variations are also possible.

In one example operation of Branch Indirect On Condition instruction 300, instruction address 358 in the current program status word 350 is replaced by the branch address (obtained from storage), if condition code 352 in the current program status word 350 designates a bit position in mask field 304 containing, e.g., a 1; otherwise, normal instruction sequencing proceeds with the updated instruction address. The updated instruction address is in the PSW in field 358. That is, in the z/Architecture, when the CPU is about to execute an instruction, but prior to execution, it fetches the instruction based on the instruction address in the PSW. Then, it determines based on, e.g., the first two bits of the instruction, the length of the instruction, and that length (e.g., 2 bytes, 4 bytes or 6 bytes) is added to instruction address 358. This is the updated address.

It is model dependent whether an access exception or a program event recording (PER) zero address detection event is recognized for the second operand when the condition code in the current PSW designates a bit position in the $M_1$ field containing, e.g., a zero.

Based on execution of the Branch Indirect On Condition instruction, the condition code remains unchanged, and the following program exceptions may be recognized: access (fetch, operand 2); operation (e.g., if the miscellaneous instruction extensions facility 2 is not installed); and transaction constraint.

Additionally, unlike other branch type instructions, such as Branch On Condition, where PER zero address detection is not performed on the branch address, a PER zero address detection event may be recognized for the second operand of the Branch Indirect On Condition instruction.

Figure 4:
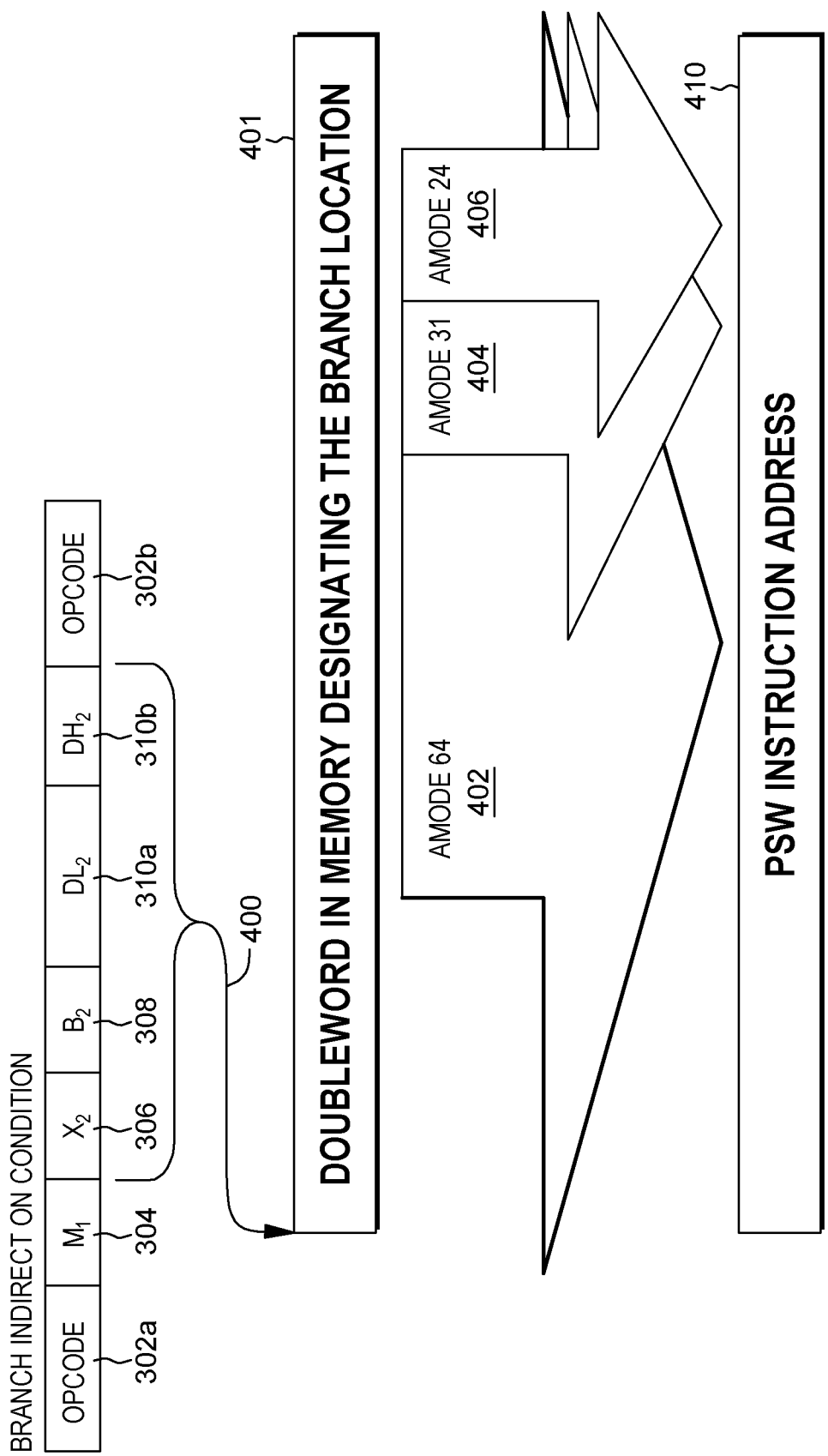
FIG. 4 pictorially depicts one example of processing associated with execution of the Branch Indirect On Condition instruction of FIG. 3A, in accordance with an aspect of the present invention.

A pictorial depiction of execution of the Branch Indirect On Condition instruction is described with reference to FIG. 4. As shown in FIG. 4, fields 306, 308, 310a and 310b of the instruction are used 400 to determine a location in memory to obtain the branch address. They indicate, e.g., a doubleword 401 in memory designating a branch address or location. This address, which is subject to the current addressing mode (Amode) specified in the PSW (e.g., Amode 64 (402), Amode 31 (404) or Amode 24 (406)), is used to replace the instruction address 410 of the current program status word, based on the condition code in the PSW. For example, if the condition code in the current program status word designates a bit position in the mask field containing, e.g., a one, then the current program status word instruction address is replaced by the branch address.

One embodiment of a flow describing aspects of the Branch Indirect On Condition instruction is described with reference to FIG. 5. In one example, the processing of FIG. 5 is performed by at least one processor.

Figure 5:
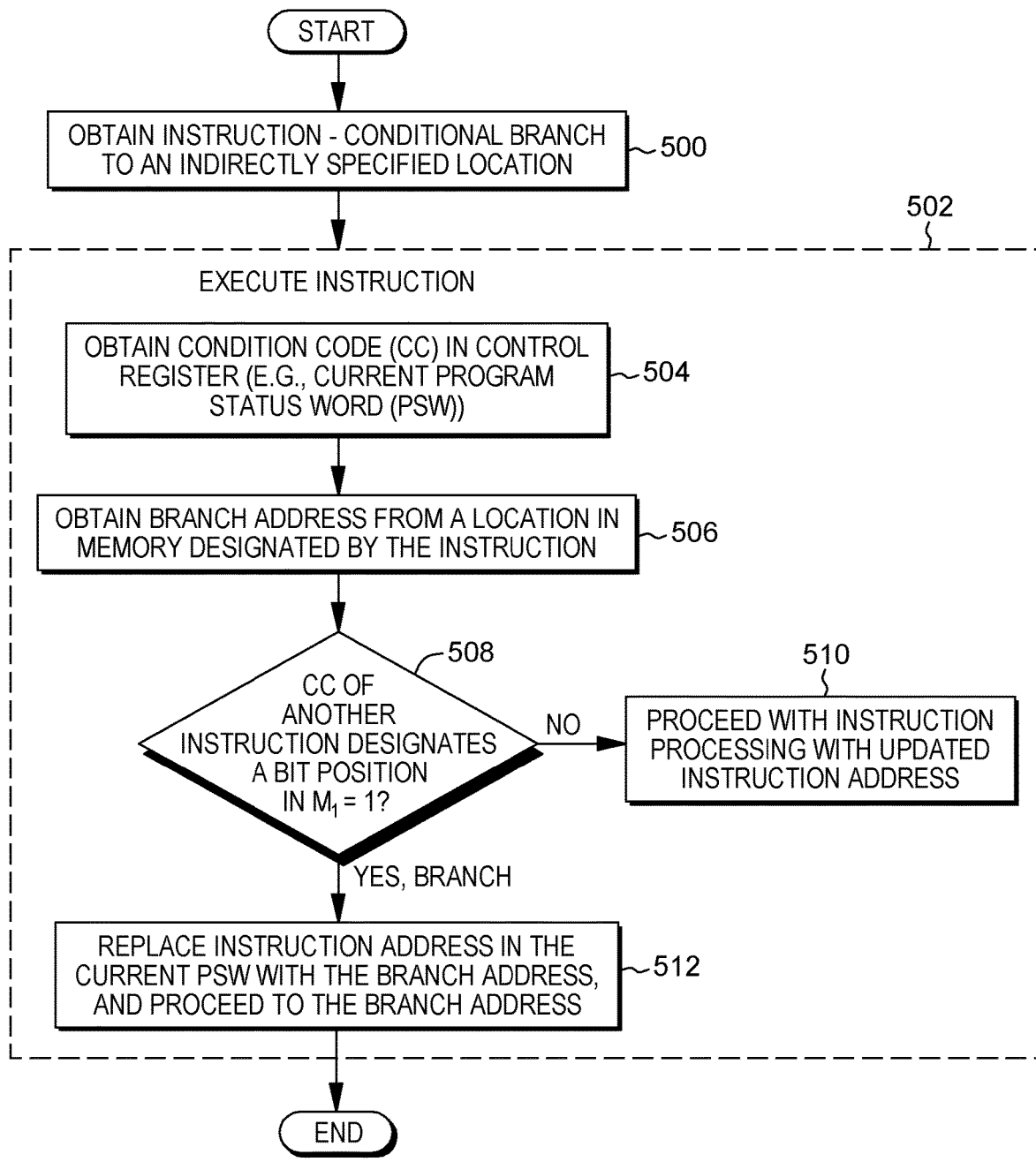
FIG. 5 depicts one example of a flow associated with aspects of the Branch Indirect On Condition instruction, in accordance with an aspect of the present invention.

Referring to FIG. 5, in one example, an instruction is obtained (e.g., have, provided, received, retrieved, etc.), STEP 500. This instruction is, for instance, the Branch Indirect On Condition instruction. The obtained instruction is then executed, STEP 502. In one example, the execution includes, for instance, obtaining the condition code from a control register (e.g., the current program status word), STEP 504. Additionally, a branch address is obtained from a location in memory designated by the instruction, STEP 506. For instance, the contents of the registers specified by the $X_2$ and $B_2$ fields are added to the displacements in the $DL_2$ and $DH_2$ fields to obtain a doubleword in memory that designates the branch address. A determination is made as to whether the condition code of another instruction (e.g., a previously executed instruction) in the current program status word designates a bit position in the $M_1$ field containing, e.g., a 1, INQUIRY 508. If the condition code in the current PSW does not designate a bit position in the $M_1$ field containing, e.g., a 1, then normal instruction sequencing proceeds with the updated instruction address in the PSW, STEP 510. However, if the condition code in the current program status word designates a bit position in the mask field containing, e.g., a 1, then a branch is to occur. Thus, the instruction address in the current program status word is replaced by the branch address, and processing proceeds to the branch address, STEP 512.

In another embodiment, the obtaining the branch address (i.e., the fetching of the second operand) occurs only if a branch is to occur (e.g., after INQUIRY 508 results in a YES and prior to STEP 512). Other variations are possible.

In one example, the Branch Indirect On Condition instruction may be useful in returning to a calling program based on a return address in memory (such as in a program stack or save area). In another example, the Branch Indirect On Condition instruction may be useful in a table based branch mechanism. Other examples are possible.

One particular example of using the Branch Indirect On Condition instruction is shown in the following code:

```
        LHI    2,0                                     Clear TRT function code.
        TRT    Buffer, ASCII                           Translate and test buffer for ASCII text.
        BIC    Table(2)                                Branch based on what is found.
        ...
Table   DC     AD(Nothing_Found)                       00
        DC     AD(Blank)                               08
        DC     AD(Alpha_Upper)                         16 (including underscore)
        DC     AD(Alpha_Lower)                         24
        DC     AD(Numeric)                             32
        DC     AD(Operator)                            40
        ...
ASCII   DS     0x_0_1_2_3_4_5_6_7_8_9_A_B_C_D_E_F
        DC     AL1(00,00,00,00,00,00,00,00,00,00,00,00,00,00,00,00)    00-0F
        DC     AL1(00,00,00,00,00,00,00,00,00,00,00,00,00,00,00,00)    10-1F
        DC     AL1(08,40,00,40,00,40,40,00,40,40,40,40,00,40,40)       20-2F
        DC     AL1(32,32,32,32,32,32,32,32,32,32,40,40,40,40,40,40)    30-3F
        DC     AL1(00,16,16,16,16,16,16,16,16,16,16,16,16,16,16,16)    40-4F
        DC     AL1(16,16,16,16,16,16,16,16,16,16,16,40,40,40,40,16)    50-5F
        DC     AL1(00,24,24,24,24,24,24,24,24,24,24,24,24,24,24,24)    60-6F
        DC     AL1(24,24,24,24,24,24,24,24,24,24,24,24,40,40,40,40,00) 70-7F
        DC     AL1(00,00,00,00,00,00,00,00,00,00,00,00,00,00,00,00)    80-8F
        DC     AL1(00,00,00,00,00,00,00,00,00,00,00,00,00,00,00,00)    90-9F
        DC     AL1(00,00,00,00,00,00,00,00,00,00,00,00,00,00,00,00)    A0-AF
        DC     AL1(00,00,00,00,00,00,00,00,00,00,00,00,00,00,00,00)    B0-BF
        DC     AL1(00,00,00,00,00,00,00,00,00,00,00,00,00,00,00,00)    C0-CF
        DC     AL1(00,00,00,00,00,00,00,00,00,00,00,00,00,00,00,00)    D0-DF
        DC     AL1(00,00,00,00,00,00,00,00,00,00,00,00,00,00,00,00)    E0-EF
        DC     AL1(00,00,00,00,00,00,00,00,00,00,00,00,00,00,00,00)    F0-FF
```

Described in detail herein is an instruction (e.g., a single architected instruction) that branches on a condition to a location specified in memory, as opposed to a register (i.e., hardware in the processor), a register plus base, or a relative offset. A conditional branch instruction is provided that branches to a location statically or dynamically determined by the program (e.g., a memory location); and branches without requiring an additional register beyond what is otherwise available to the program. For example, it branches to a location when no other register is available or is to be used other than the program-stack register.

There are numerous cases where a program may have incorporated the branch location into a program register. As an example, in a called subroutine, the location to branch to when the subroutine completes is often placed into a save area (such as program stack). As a further example, the program may use a table of addresses representing various locations to branch to, depending on computed decisions. This is common in text parsing, where separate addresses in a table represent the address of subsequent processing functions for alphabetic, numeric, punctuation, operator, white-space, and so forth.

For these examples, the program may have limited (or no) spare registers into which it can load the branch address, but it may still have a register providing addressability to a storage location containing the branch address. Thus, in accordance with an aspect of the present invention, a mechanism is provided to directly branch to a location specified in storage, without having to pre-load the address into a register.

Described in detail herein is a single conditional branch instruction (e.g., based on a condition code set by a previously executed instruction) that obtains the location to be branched to from a storage (i.e., memory) operand. The branch address is indirectly specified in that the branch location is not directly available from a register (i.e., hardware within the CPU) or a combination of base register, index register and displacement or from an immediate value relative to the PSW; rather the branch location is a field in memory that is specified by the combination of base register, index register and displacement. This provides more efficient processing within a computing environment; it allows a program to conditionally branch to a location in storage. One or more aspects of the present invention are inextricably tied to computer technology and facilitate processing within a computer, improving performance thereof.

Figure 6A:
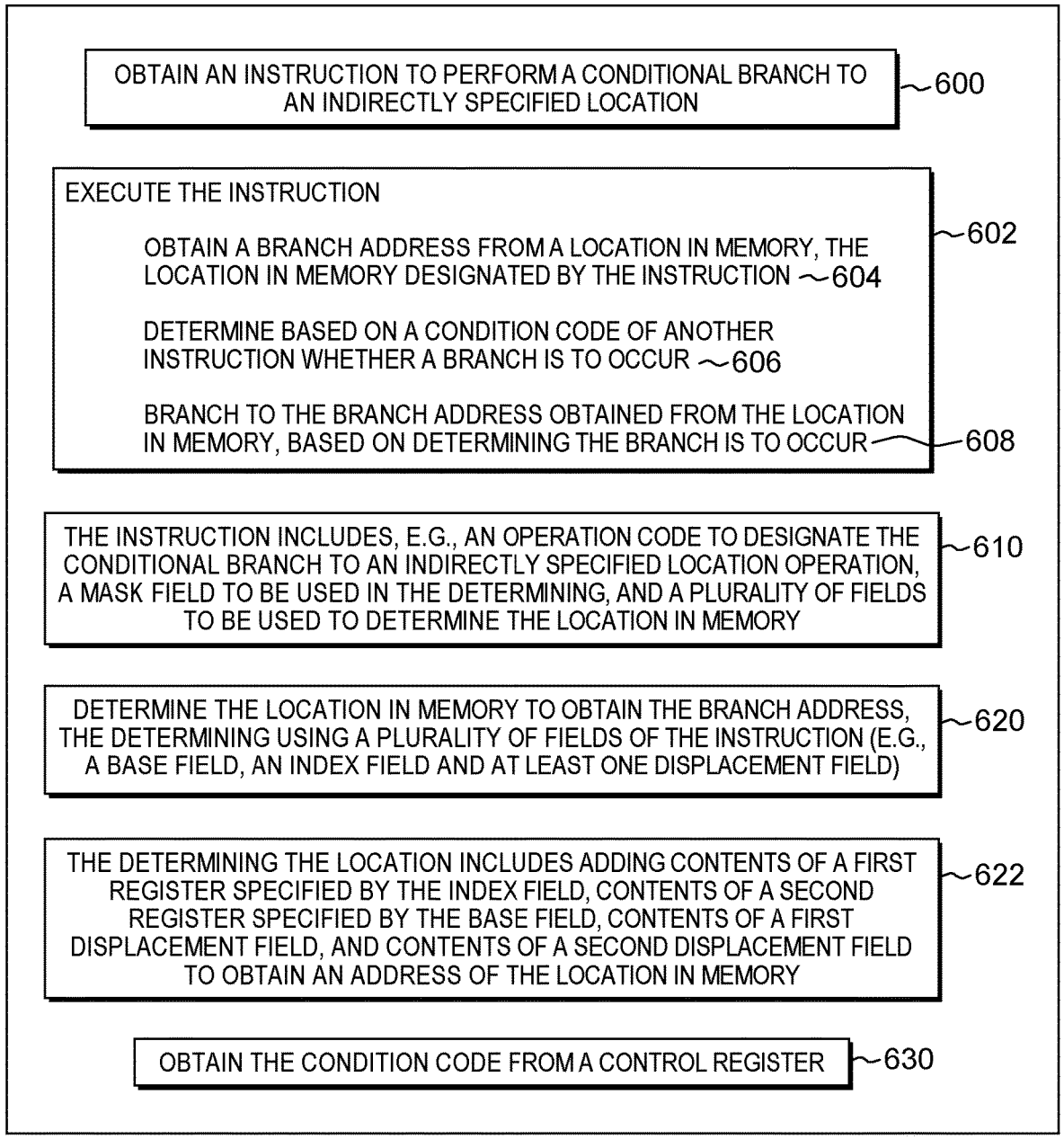

One embodiment of aspects of the invention relating to facilitating processing in a computing environment are described with reference to FIGS. 6A-6B. Referring to FIG. 6A, in one example, an instruction is obtained to perform a conditional branch to an indirectly specified location (600), and the instruction is executed (602). The executing includes, for instance, obtaining a branch address from a location in memory, the location in memory designated by the instruction (604), determining based on a condition code of another instruction, such as a previously executed instruction, whether a branch is to occur (606), and branching to the branch address obtained from the location in memory, based on determining the branch is to occur (608).

As one example, the instruction includes, e.g., an operation code to designate the conditional branch to an indirectly specified location operation, a mask field to be used in the determining, and a plurality of fields to be used to determine the location in memory to obtain the branch address (610).

In one embodiment, the location in memory to obtain the branch address is determined using, for instance, a plurality of fields of the instruction, such as a base field, an index field and at least one displacement field) (620).

As one example, the determining the location includes adding contents of a first register specified by the index field, contents of a second register specified by the base field, contents of a first displacement field, and contents of a second displacement field to obtain an address of the location in memory (622).

In one embodiment, the condition code is obtained from a control register (630).

Further, referring to FIG. 6B, in one embodiment, the determining whether the branch is to occur includes using the condition code to select a unit (e.g., a bit) in a mask associated with the instruction (e.g., the mask is a field of the instruction) (640), checking a value of the unit (644), and indicating branching, based on the checking determining the value is a particular value (646).

Moreover, in one example, the branching includes replacing an instruction address in a control register with the branch address, and proceeding to the branch address to continue processing (650).

Many variations are possible.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Additionally, the computer system and/or environment may include more, fewer and/or different components. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing in a computing environment, said computer program product comprising:
    at least one computer readable storage medium readable by at least one processing circuit and storing instructions to perform a method comprising:
        obtaining an instruction to perform a conditional branch to an indirectly specified location; and
        executing the instruction, the executing comprising:
            obtaining a branch address from a location in memory, the location in memory designated by the instruction, wherein contents of one register specified in an index field of the instruction plus contents of another register specified in a base field of the instruction added to a displacement specified in the instruction provide an address in memory defining the location in memory;
            determining based on a condition code of another instruction whether a branch is to occur, the determining using the condition code to index into a mask provided by the instruction to determine whether the branch is to occur; and
            branching to the branch address obtained from the location in memory, based on determining that the branch is to occur, wherein the branching is performed absent pre-loading the branch address into a register.

2. The computer program product of claim 1, wherein the displacement is provided in one or more displacement fields of the instruction.

3. The computer program product of claim 2, wherein the one or more displacement fields comprise a first displacement field and a second displacement field used to provide a signed binary integer added to the contents of the one register and the other register to provide the location in memory to obtain the branch address.

4. The computer program product of claim 1, wherein program event recording zero address detection is performed for the branch address.

5. The computer program product of claim 1, wherein the method further comprises obtaining the condition code from a control register.

6. The computer program product of claim 1, wherein the determining whether the branch is to occur comprises:
    using the condition code to select a unit in the mask associated with the instruction;

checking a value of the unit; and indicating branching, based on the checking determining that the value is a particular value.

7. The computer program product of claim 6, wherein the mask is a field of the instruction.

8. The computer program product of claim 6, wherein the unit is a bit.

9. The computer program product of claim 1, wherein the instruction comprises an operation code to designate the conditional branch to an indirectly specified location operation, and a mask field to be used in the determining whether the branch is to occur.

10. The computer program product of claim 1, wherein the branching comprises:

replacing an instruction address in a control register with the branch address obtained directly from the location in memory; and proceeding to the branch address to continue processing.

11. A computer system for facilitating processing in a computing environment, said computer system comprising:

a memory; and a processor in communication with the memory, wherein the computer system is configured to perform a method, said method comprising:

obtaining an instruction to perform a conditional branch to an indirectly specified location; and executing the instruction, the executing comprising:

obtaining a branch address from a location in memory, the location in memory designated by the instruction, wherein contents of one register specified in an index field of the instruction plus contents of another register specified in a base field of the instruction added to a displacement specified in the instruction provide an address in memory defining the location in memory;

determining based on a condition code of another instruction whether a branch is to occur, the determining using the condition code to index into a mask provided by the instruction to determine whether the branch is to occur; and branching to the branch address obtained from the location in memory, based on determining that the branch is to occur, wherein the branching is performed absent pre-loading the branch address into a register.

12. The computer system of claim 11, wherein the displacement is provided in one or more fields of the instruction.

13. The computer system of claim 11, wherein the determining whether the branch is to occur comprises:

using the condition code to select a unit in the mask associated with the instruction;

checking a value of the unit; and indicating branching, based on the checking determining that the value is a particular value.

14. The computer system of claim 13, wherein the mask is a field of the instruction, and wherein the unit is a bit.

15. The computer system of claim 11, wherein the branching comprises:

replacing an instruction address in a control register with the branch address obtained directly from the location in memory; and proceeding to the branch address to continue processing.

16. A computer-implemented method of facilitating processing in a computing environment, said computer-implemented method comprising:

obtaining an instruction to perform a conditional branch to an indirectly specified location; and executing, by at least one processor, the instruction, the executing comprising:

obtaining a branch address from a location in memory, the location in memory designated by the instruction, wherein contents of one register specified in an index field of the instruction plus contents of another register specified in a base field of the instruction added to a displacement specified in the instruction provide an address in memory defining the location in memory;

determining based on a condition code of another instruction whether a branch is to occur, the determining using the condition code to index into a mask provided by the instruction to determine whether the branch is to occur; and branching to the branch address obtained from the location in memory, based on determining that the branch is to occur, wherein the branching is performed absent pre-loading the branch address into a register.

17. The computer-implemented method of claim 16, displacement is provided in one or more fields of the instruction.

18. The computer-implemented method of claim 16, wherein the determining whether the branch is to occur comprises:

using the condition code to select a unit in the mask associated with the instruction;

checking a value of the unit; and indicating branching, based on the checking determining that the value is a particular value.

19. The computer-implemented method of claim 18, wherein the mask is a field of the instruction, and wherein the unit is a bit.

20. The computer-implemented method of claim 16, wherein the branching comprises:

replacing an instruction address in a control register with the branch address obtained directly from the location in memory; and proceeding to the branch address to continue processing.

* * * * *